Dec. 27, 1949  H. J. WOOD  2,492,672
TURBINE DRIVEN FLUID CIRCULATING UNIT
Filed July 26, 1946  4 Sheets-Sheet 1
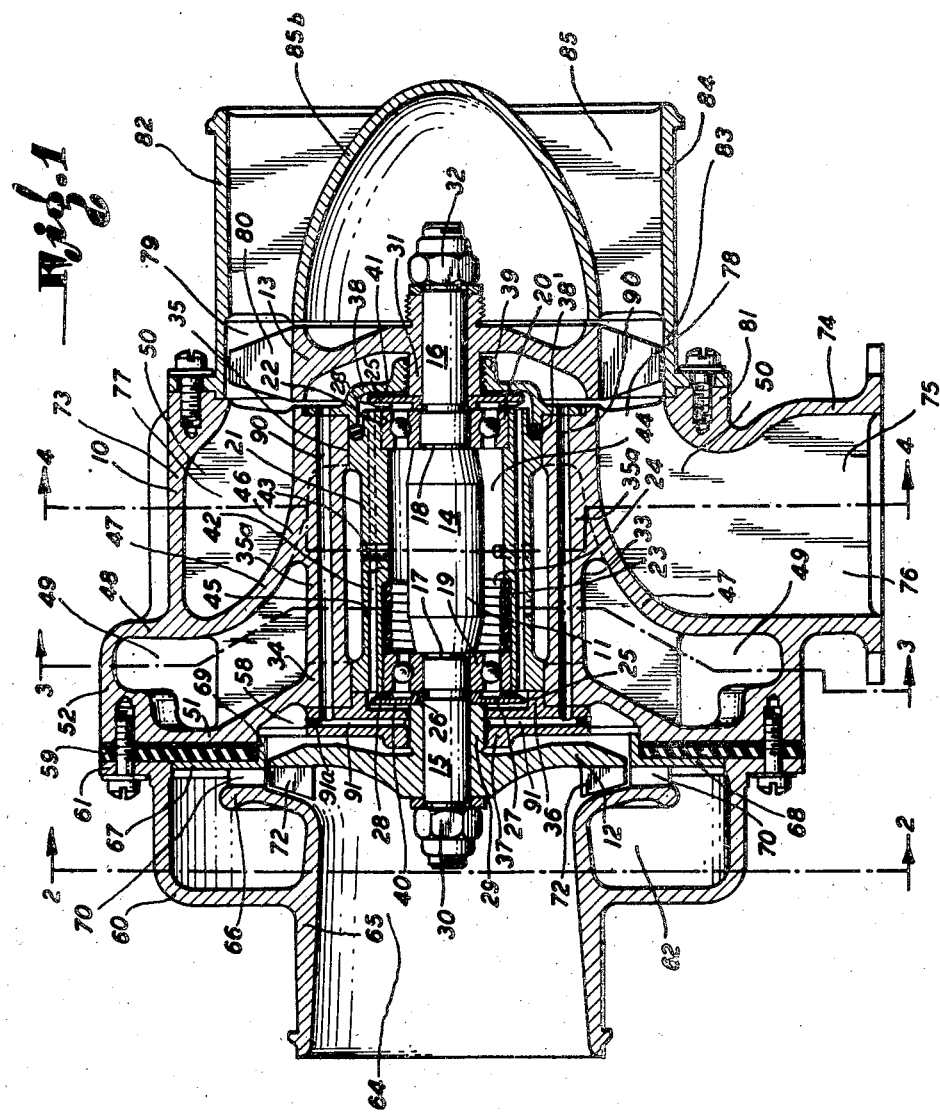
Fig. 1
INVENTOR.
HOMER J. WOOD
BY
ATTORNEY Dec. 27, 1949  H. J. WOOD  2,492,672
TURBINE DRIVEN FLUID CIRCULATING UNIT
Filed July 26, 1946  4 Sheets-Sheet 2

INVENTOR.
HOMER J. WOOD
BY
ATTORNEY

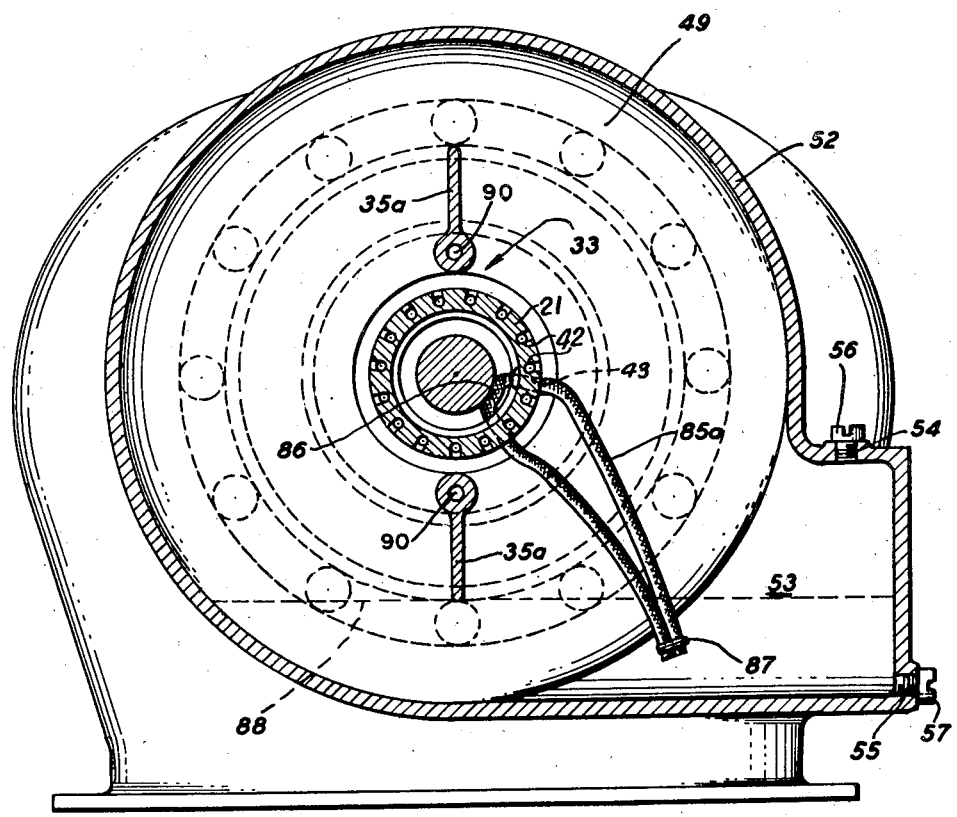

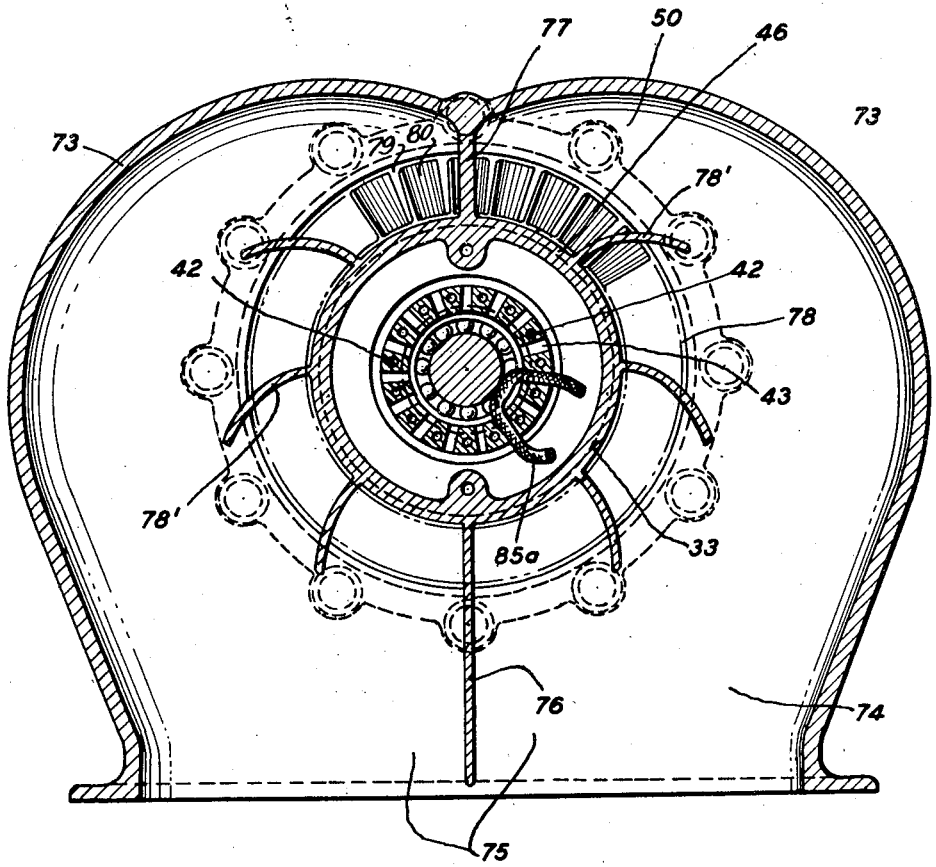

Patented Dec. 27, 1949

2,492,672

UNITED STATES PATENT OFFICE 2,492,672

TURBINE DRIVEN FLUID CIRCULATING UNIT

Homer J. Wood, Los Angeles, Calif., assignor to The Garrett Corporation, Los Angeles, Calif., a corporation of California Application July 26, 1946, Serial No. 686,275

17 Claims. (Cl. 230—116)

1

This invention relates to expansion turbines for use in refrigeration systems wherein air is compressed and then expanded through a turbine which cools the air and recovers some of the power represented by the compression of the air, and relates in particular to a compact turbine and fan unit wherein the power recovered by the turbine is used to drive a fan impeller.

It is an object of the invention to provide an expansion turbine having high volumetric capacity for a given size and weight of device, obtainable through use of a turbine rotor capable of operation at extremely high velocities.

It is an object of the invention to provide an expansion turbine having a means for lubricating its bearings in such a manner that a minimum heating of the bearings occurs during the operation of the turbine.

A further object of the invention is to provide an expansion turbine having a simple means for circulating a limited quantity of oil through the bearings and to produce a circulation of air through the bearings, to carry to and through the bearings the small globules of oil produced by the operation of the bearings at high velocities.

A further object of the invention is to provide in a device of this character an effective means for supporting the bearings in the housing of the device and for minimizing loss of lubricant from the bearing chamber of the device.

A further object of the invention is to provide a device of this character having means for equalizing the pressures at the ends of the bearing chamber so that loss of lubricant from the bearing chamber will be minimized.

A further object of the invention is to provide a bearing structure for a rotary device of this character having an insertable bearing support of novel and characteristic form and having means for precluding the bearings so that vibrations will not develop in the operation of the device as a result of looseness or play in the bearings.

A further object of the invention is to provide a turbine device of this character especially adapted, though not limited, to use in aircraft due to its small size and weight for a given capacity, and, further, due to the fact that it will operate in the various positions or at the various angles relative to horizontal produced by maneuvering of an aircraft.

Further objects and advantages of the invention may be brought out in the following part of the specification.

Referring to the drawings which are for illustrative purposes only,

Fig. 1 is a longitudinal sectional view through a preferred form of my invention.

2

Figure 2:
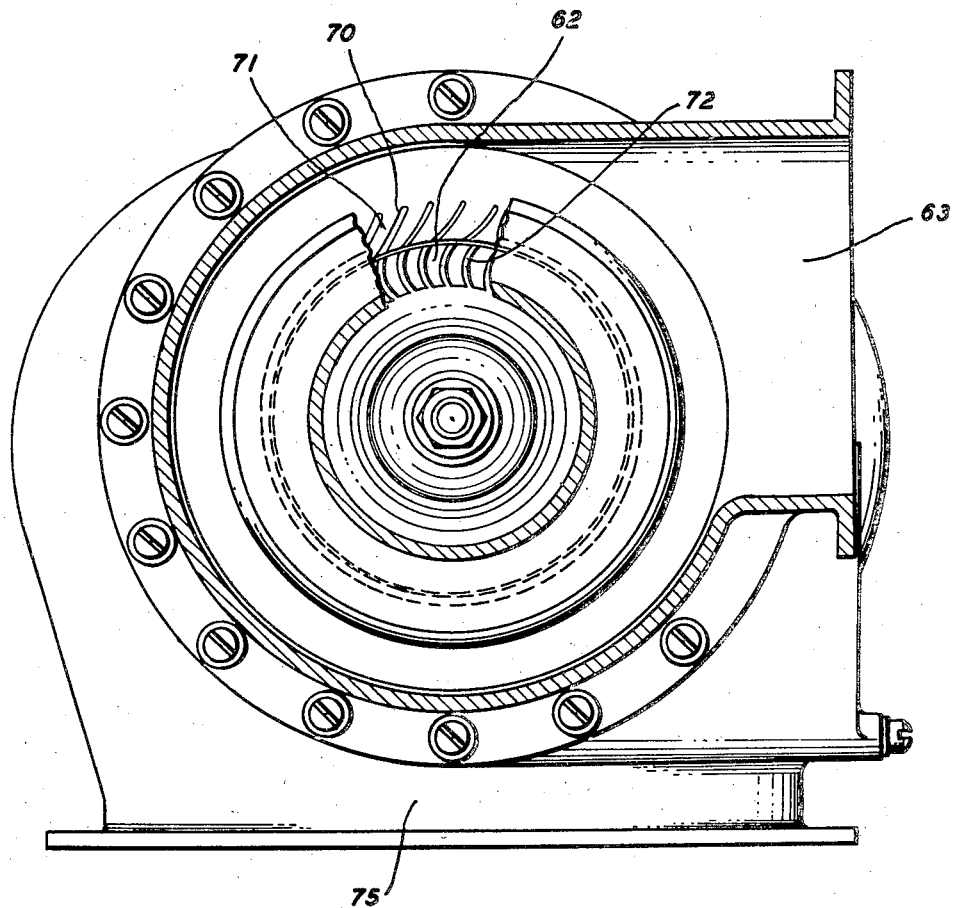
Fig. 2 is a sectional view taken substantially as indicated by the line 2—2 of Fig. 1.

Fig. 3 is a sectional view taken as indicated by the line 3—3 of Fig. 1.

Fig. 4 is a sectional view taken substantially as indicated by the line 4—4 of Fig. 1.

All of the cooperating parts of the turbine and fan unit are supported by a housing 10, as shown in Fig. 1, this housing 10 having characteristics which will be hereinafter described in detail.

The invention includes a shaft 11 having on its front end a turbine rotor 12 whereby it is driven at high speed, and having on its rear end a fan 13 adapted to utilize the power recovered by the turbine rotor 12 to pump air. The shaft 11 has an intermediate portion 14 of major diameter and projecting end portions 15 and 16 of reduced diameter, there being shoulders 17 and 18 at the ends of the intermediate portion 14, against which the inner races of ball bearings 19 and 20 rest.

The bearings 19 and 20 are carried in a bearing support 21 having a tubular wall. This bearing support 21 has in its rear end a short counterbore 22 to receive the outer race of the bearing 20, and has at its front end a long counterbore 23 which receives a compression spring 24 and the outer race of the ball bearing 19.

An air circulating member 25 is disposed on the front shaft portion 15 adjacent the front end of the bearing support 21. This air circulating member 25 comprises a hub 26 for engaging the inner race of the ball bearing 19 and a radial disc 27 which projects from the hub 26 across the front end of the bearing support 21 and has projections or vanes 28 on the surface thereof faced toward the front end of the bearing support 21, to act as a fan. The rotor 12 has a hub 29 projecting toward the air circulating member 25, and a nut 30 threaded onto the front end of the shaft portion 15 forces the parts 29, 26, and 19 together so that the inner race of the bearing 19 is pressed against the shoulder 17 of the shaft 11.

The arrangement of parts on the opposite end of the shaft 11 is similar. There is an air circulating member 25 on the shaft portion 16 adapted to be forced toward the shoulder 18 by the hub 31 of the fan 13, so as to press the inner race of the bearing 20 tightly against the shoulder 18, when axial force is applied to the hub 31 by a nut 32 threaded onto the end of the shaft portion 16.

The bearing support, which is of tubular form, is supported in the housing 10 by the inner wall structure 33 of the housing 10, which wall structure includes a front ring 34, a rear ring 35, and interconnecting members 35a extending parallel to the axis of the shaft from the front ring 34 to the rear ring 35. The bearing support 21 is held in place in the housing 10 by a plate 36 which is secured against the outer face of the ring 34 as by screws or in any other suitable manner, and has an annular wall 37 surrounding the hub 29 of the turbine rotor 12, and the bearing support 21 is further held in place by a plate 38 which is secured against the outer face of the ring 35, as by screws or in any other suitable manner, and has an annular wall 39 surrounding the hub 31 of the fan 13. A sealing ring 38' is disposed between the rightward end of the tubular bearing holder 21 and the rear ring 35 of the inner wall structure 33. The plates 36 and 38 respectively provide recesses 40 and 41 to receive the air circulating members 25.

The bearing support 21 has therein longitudinally extending passages 42 connecting the recesses 40 and 41, radial openings or passages 43 connecting the shaft or bearing chamber 44 with the exterior of the bearing support 21, and radial openings 45 for each of the passages 42, for connecting intermediate parts of the passages 42 with the exterior of the bearing support 21.

The inner wall structure 33 includes, in addition to the rings 34 and 35, an annular wall 46 which merges through a curved wall 47 with a radial wall 48, the walls 46, 47, and 48 constituting a septum between an oil chamber 49, which is formed around the front portion of the inner wall structure 33, and an annular air duct 50, which is formed around the rearward portion of the inner wall structure 33.

The oil chamber 49 is completed by a radial wall 51, the inner portion of which is connected to the ring 34, and a peripheral wall 52 formed in cooperation with the wall 51 so that the oil chamber 49 will have a lateral extension 53, as shown in Fig. 3. Filling and drain ports 54 and 55, closed respectively by plugs 56 and 57, communicate respectively with the oil chamber 49.

The front wall 51 of the oil chamber 49 has an annular recess 58 to contain the plate 36 and a portion of the turbine rotor 12. Against the front wall 51 an annular insulating gasket 59 is placed. An air turbine inlet and outlet casing 60 is provided which has a radial flange 61 secured against the outer portion of the gasket 59. The casing 60 includes an annular inlet chamber 62 having a flanged inlet port 63 as shown in Fig. 2, this annular inlet chamber 62 surrounding the inner portion 64 of an axially arranged tubular wall 65, Fig. 1, which forms the outlet for the turbine. At the inner end of the portion 64 of the tubular wall 65 there is a radially disposed wall 66 spaced outwardly in axial direction from the face of the gasket 59 to leave a space in which a nozzle member 67 is disposed. This nozzle member 67 comprises a radial wall 68 to fit against the flange of the gasket 59, a cylindric flange 69 extending from the inner edge of the radial wall 68 through the opening of the gasket 59 and into the peripheral portion of the recess 58, whereby axial alignment of the nozzle member 67 with the rotary parts of the device is accomplished. The nozzle member 67 has on the inner portion of its radial wall 68 curved wall members 70 which project in circumferentially spaced arrangement into engagement with the radial wall 66 of the casing 60, thereby providing nozzle openings. As shown in Fig. 2, these wall members 70 are separated by spaces 71 defining nozzles leading to the blades 72 of the turbine rotor 12. These blades 72 extend from the outer portion of the rotor 12 in a direction parallel to the axis of rotation of the rotor and into close proximity with the inner portion of the radial wall 66, as shown in Fig. 1. The outer portion of the radial wall 66 engages the nozzle forming walls 70 of the nozzle member 67 and forces the nozzle member 67 against the face of the gasket 59.

The air duct 50 has an outer wall 73 shaped as shown in Fig. 4 which merges with a radially disposed wall 74 spaced from the wall 48 whereby an opening in the form of a divided inlet 75 for the air duct 50 is provided, there being a dividing web 76 extending downwardly from the annular wall structure 46 and a wall 77 extending upwardly from the annular wall structure 46 to serve as means of division between the two sides of the air duct 50 which has an annular mouth or opening 78 around the rear extremity of the annular wall structure and of the bearing support 21, this opening having air directing vanes 78' therein and communicating with the fan vane space 79 in which the blades or vanes 80 of the fan 13 are positioned. As shown in Fig. 1, the mouth or opening 78 is circumscribed by an annular wall 81 which is integral with the walls 73 and 74. To this annular wall 81 an air outlet 82 is connected, this air outlet 82 having a cylindrical wall portion 83 defining the outer limit of the pumping space 79 in which the blades 80 of the fan operate. The outlet 82 has also an outer cylindric wall portion 84 with inwardly extending diffuser webs 85 which support a dome 85b which covers the body of the fan 13, the shaft portion 16 and the nut threaded on the end thereof.

For lubrication of the bearings 19 and 20 a wick 85a is threaded through two of the radial openings 43 of the bearing support 21 so as to form a loop as shown in Fig. 3, the intermediate portion 86 of this loop engaging the surface of the intermediate portion 14 of the shaft 11. The ends of the wick 85a are connected by a metal band 87 which serves as a weight to hold the ends of the wick 85a in a body of light oil placed in the bottom of the chamber 49, the level of such body of oil being indicated by the broken line 88. When the turbine and pumping unit is in operation, the air circulating members 25, rotating at high velocity, cause air to circulate in two paths in the bearing chamber 44, outwardly along the shaft from the radial openings 43, through the bearings 19 and 20, radially outwardly across the end faces of the bearing support 21, into the passages 42 and thence to the openings 45 through which the air flows will pass outwardly into the oil chamber 49 to be subsequently drawn into the radial openings 43 from the outer ends thereof. The two circulating streams of air carry oil from the wick outwardly to and into the bearings 19 and 20 in exceedingly small quantity. Some of this oil passes through the bearings, but a greater portion of the oil is first broken up into small globules by the action of the shaft and bearings traveling at high velocity, and passes outwardly from the bearings in the form of a mist. Some of the oil of this mist may be recirculated, and some may be condensed in the oil chamber 49.

To minimize escape of oil from the recesses 40 and 41 at the ends of the bearing support 21, the pressures in the external communications of these recesses 40 and 41 are equalized. The pressure created adjacent the external face of the plate 37 due to the operation of the rotor 12 is applied to the small space existing between the rotor hub 29 and the annular wall 37 of the plate 36. This pressure is also transmitted via radial passages 91 in the plate 36, to longitudinal passages 90 in the inner wall structure 33 from end to end thereof, to the area adjacent the external face of the plate 38, and thence to the bore of its annular wall 39 which receives the fan hub 31. These radial passages 91, which may be drilled and closed at their outer ends by suitable plugs 91a, communicate with the rotor hub 29 at a point intermediate the ends of the bore through the annular wall 37 of the plate 36, whereby the pressure existing around the portion of the hub which extends toward the disc 27 will be the same as the pressure existing around the hub 31 within the annular wall 39 of the plate 38.

In the operation of the unit disclosed herein, air under pressure passes through the inlet chamber 62 of the expansion turbine and passes radially inwardly through the nozzle spaces between the nozzle forming walls 70 to engage the blades 72 of the turbine rotor 12 which is caused to rotate at high velocity, ranging from ten thousand to one hundred thousand R. P. M. or greater, depending upon the size in which the unit is made. The absorption of power from the air, resulting from the driving of the turbine rotor 12, and the expansion of air as it passes through the spaces between the turbine blades 72 and into the outlet 65, results in a cooling of the air in an efficient manner. The fan 13 constitutes a power utilizing means for usefully applying a load to the turbine rotor 12. The action of its blades 80 is to pump a flow of air from the duct 50 and through the outlet 82, thereby providing a means for producing a flow of air from one locality to another as may be required in the air conditioning of an aircraft cabin or for other utilization of air wherein a flow thereof is required.

I claim as my invention:

1. In a turbine driven fan device, the combination of: an inner wall structure including a tubular bearing support extending from end to end thereof; bearings in said tubular support; a shaft supported by said bearings; a fan on one end of said shaft having air impelling vanes operable in a vane space; an outer wall structure in surrounding relation to said inner wall structure and defining an air passage having an opening communicating with said vane space and a second opening; a wall connected to said outer wall structure defining an air passage communicating with another portion of said vane space; a turbine rotor mounted on the other end of said shaft, having blades forming radial flow passages; an annular radial wall surrounding said rotor having axially projecting wall members forming radial nozzle channels aligned with said radial flow passages of said rotor; and a removable fluid inlet casing having inner and outer walls forming an annular inlet chamber communicating with the outer ends of said nozzle channels, the inner wall of said inlet casing engaging the ends faces of said wall members so as to form turbine fluid inlet nozzles of said nozzle channels.

2. In a turbine driven fan device, the combination of: an inner wall structure including a tubular bearing support extending from end to end thereof; bearings in said tubular support; a shaft supported by said bearings; a fan on one end of said shaft having air impelling vanes operable in a vane space; an outer wall structure in surrounding relation to said inner wall structure and defining an air passage having an opening communicating with said vane space and a second opening; a wall connected to said outer wall structure defining an air passage communicating with another portion of said vane space; a turbine rotor mounted on the other end of said shaft, having blades forming radial flow passages; an annular radial wall surrounding said rotor having axially projecting wall members forming radial nozzle channels aligned with said radial flow passages of said rotor; and a removable fluid inlet casing having inner and outer walls forming an annular inlet chamber communicating with the outer ends of said nozzle channels, the inner wall of said inlet casing engaging the end faces of said wall members so as to form turbine fluid inlet nozzles of said nozzle channels, and said inner wall having an annular portion which lies across the side of said radial flow passages of said rotor.

3. In a turbine driven fan device, the combination of: an inner wall structure including a tubular bearing support extending from end to end thereof; bearings in said tubular support; a shaft supported by said bearings; a fan on one end of said shaft having air impelling vanes operable in a vane space; an outer wall structure in surrounding relation to said inner wall structure and defining an air passage having an opening communicating with said vane space and a second opening; a wall connected to said outer wall structure defining an air passage communicating with another portion of said vane space; a turbine rotor mounted on the other end of said shaft, having blades forming radial flow passages; an annular radial wall surrounding said rotor having axially projecting wall members forming radial nozzle channels aligned with said radial flow passages of said rotor; and a removable fluid inlet casing having inner and outer walls forming an annular inlet chamber communicating with the outer ends of said nozzle channels, the inner wall of said inlet casing having an inner annular portion, defining an outlet passage to receive the fluid which discharges from said radial flow passages of said rotor, and a flange portion which extends outwardly across the open sides of said radial flow passages to confine fluid flow therein and engages the end faces of said wall members, so as to form turbine fluid inlet nozzles of said nozzle channels.

4. In a turbine driven fan device, the combination of: an inner wall structure including a tubular bearing support extending from end to end thereof; bearings in said tubular support; a shaft supported by said bearings; an axial flow fan on one end of said shaft having air impelling vanes operable in a vane space; an outer wall structure in surrounding relation to said inner wall structure and defining an air passage having an annular opening communicating with one side of said vane space and a second opening; a tubular wall connected to said outer wall structure defining an air passage communicating with the opposite side of said vane space; a turbine rotor mounted on the other end of said shaft, having blades forming radial flow passages; an annular radial wall surrounding said rotor having axially projecting wall members forming radial nozzle channels aligned with said radial flow passages of said rotor; and a removable fluid inlet casing having inner and outer walls forming an annular inlet chamber communicating with the outer ends of said nozzle channels, the inner wall of said inlet casing having an inner annular portion, defining an outlet passage to receive the fluid which discharges from said radial flow passages of said rotor, and a flange portion which extends outwardly across the open sides of said radial flow passages to confine fluid flow therein and engages the end faces of said wall members, so as to form turbine fluid inlet nozzles of said nozzle channels.

5. In a turbine driven device, the combination of: an inner wall structure including a tubular bearing support extending from end to end thereof; bearings in said tubular support; a shaft supported by said bearings; a driven device connected to one end of said shaft; a turbine rotor mounted on the other end of said shaft, having blades forming radial flow passages; an annular radial wall surrounding said rotor having axially projecting wall members forming radial nozzle channels aligned with said radial flow passages of said rotor; and a removable fluid inlet casing having inner and outer walls forming an annular inlet chamber communicating with the outer ends of said nozzle channels, the inner wall of said inlet casing engaging the end faces of said wall members so as to form turbine fluid inlet nozzles of said nozzle channels.

6. In a turbine driven device, the combination of: an inner wall structure including a tubular bearing support extending from end to end thereof; bearings in said tubular support; a shaft supported by said bearings; a driven device connected to one end of said shaft; a turbine rotor mounted on the other end of said shaft, having blades forming radial flow passages; an annular radial wall surrounding said rotor having axially projecting wall members forming radial nozzle channels aligned with said radial flow passages of said rotor; and a removable fluid inlet casing having inner and outer walls forming an annular inlet chamber communicating with the outer ends of said nozzle channels, the inner wall of said inlet casing having an inner annular portion, defining an outlet passage to receive the fluid which discharges from said radial flow passages of said rotor, and a flange portion which extends outwardly across the open sides of said radial flow passages to confine fluid flow therein and engages the end faces of said wall members, so as to form turbine fluid inlet nozzles of said nozzle channels.

7. In a turbine driven device of the character described, the combination of: a casing having an inner wall structure supporting a tubular walled bearing support which extends from the front end to the rear end of said casing, and an outer wall structure forming a lubricant chamber surrounding at least a portion of said tubular wall, said tubular wall having passages extending therein so as to communicate with the spaces at the ends of said tubular wall and with the lubricant chamber, said tubular wall having radial openings connecting said lubricant chamber with the shaft space inside said tubular wall; a shaft extending axially through said shaft space of said tubular wall; bearings at the ends of said tubular wall supporting said shaft for rotation; a turbine connected to one end of said shaft; a driven device connected to the other end of said shaft; and means on the shaft adjacent the ends of said tubular wall for producing flows of fluid inwardly from said lubricant chamber through said radial openings in said tubular wall, outwardly therefrom through said shaft space and through said bearings, and inwardly axially from the ends of said tubular wall through said passages to said lubricant chamber.

8. In a turbine driven device of the character described, the combination of: a casing having an inner wall structure supporting a tubular walled bearing support which extends from the front end to the rear end of said casing, and an outer wall structure forming a lubricant chamber surrounding at least a portion of said tubular wall, said tubular wall having passages extending therein so as to communicate with the spaces at the ends of said tubular wall and with the lubricant chamber, said tubular wall having radial openings connecting said lubricant chamber with the shaft space inside said tubular wall; a shaft extending axially through said shaft space of said tubular wall; bearings at the ends of said tubular wall supporting said shaft for rotation; a turbine connected to one end of said shaft; a driven device connected to the other end of said shaft; walls at the ends of said casing to form fan chambers across the ends of said tubular wall; and fan members on said shaft in said fan chambers adjacent the ends of said tubular wall for producing flows of fluid inwardly from said lubricant chamber through said radial openings in said tubular wall, outwardly therefrom through said shaft space and through said bearings, and inwardly axially from the ends of said tubular wall through said passages to said lubricant chamber.

9. In a turbine driven device of the character described, the combination of: a casing having an inner wall structure supporting a tubular walled bearing support which extends from the front end to the rear end of said casing, and an outer wall structure forming a lubricant chamber surrounding at least a portion of said tubular wall, said tubular wall having passages extending therein so as to communicate with the spaces at the ends of said tubular wall and with the lubricant chamber, said tubular wall having radial openings connecting said lubricant chamber with the shaft space inside said tubular wall; a shaft extending axially through said shaft space of said tubular wall; bearings at the ends of said tubular wall supporting said shaft for rotation; a turbine connected to one end of said shaft; a driven device connected to the other end of said shaft; walls at the ends of said casing to form fan chambers across the ends of said tubular wall; fan members on said shaft in said fan chambers adjacent the ends of said tubular wall for producing flows of fluid inwardly from said lubricant chamber through said radial openings in said tubular wall, outwardly therefrom through said shaft space and through said bearings, and inwardly axially from the ends of said tubular wall through said passages to said lubricant chamber; and means for balancing the fluid pressures around said shaft externally adjacent said fan chambers.

10. In a turbine driven device of the character described, the combination of: a casing having an inner wall structure supporting a tubular walled bearing support which extends from the front end to the rear end of said casing, and an outer wall structure forming a lubricant chamber surrounding at least a portion of said tubular wall, said tubular wall having passages extending therein so as to communicate with the spaces at the ends of said tubular wall and with the lubricant chamber, said tubular wall having radial openings connecting said lubricant chamber with the shaft space inside said tubular wall; a shaft extending axially through said shaft space of said tubular wall; bearings at the ends of said tubular wall supporting said shaft for rotation; a turbine connected to one end of said shaft; a driven device connected to the other end of said shaft; walls at the ends of said casing to form fan chambers across the ends of said tubular wall; fan members on said shaft in said fan chambers adjacent the ends of said tubular wall for producing flows of fluid inwardly from said lubricant chamber through said radial openings in said tubular wall, outwardly therefrom through said shaft space and through said bearings, and inwardly axially from the ends of said tubular wall through said passages to said lubricant chamber; and a passage extending longitudinally through said inner wall structure from end to end of said casing for balancing the fluid pressures around said shaft externally adjacent said fan chambers.

11. In a turbine driven fan device of the character described, the combination of: a casing having an inner wall structure supporting a tubular walled bearing support which extends from the front end to the rear end of said casing, and an outer wall structure forming a lubricant chamber surrounding at least a portion of said tubular wall and an air duct around the rearward portion of said inner wall structure having an annular opening at the rear end of said casing and a lateral opening, said tubular wall having passages extending therein so as to communicate with the spaces at the ends of said tubular wall and with the lubricant chamber, said tubular wall having radial openings connecting said lubricant chamber with the shaft space inside said tubular wall; a shaft extending axially through said shaft space of said tubular wall; bearings at the ends of said tubular wall supporting said shaft for rotation; a turbine at the front end of said casing having a rotor on the front end of said shaft; a fan structure on the rear end of said casing having an impeller connected to the rear end of said shaft with blades for moving air through said annular opening; walls at the ends of said casing to form fan chambers across the ends of said tubular wall; fan members on said shaft in said fan chambers adjacent the ends of said tubular wall for producing flows of fluid inwardly from said lubricant chamber through said radial openings in said tubular wall, outwardly therefrom through said shaft space and through said bearings, and inwardly axially from the ends of said tubular wall through said passages to said lubricant chamber; and means for balancing the fluid pressures around said shaft externally adjacent said fan chambers.

12. In a turbine driven fan device of the character described, the combination of: a casing having an inner wall structure supporting a tubular walled bearing support which extends from the front end to the rear end of said casing, and an outer wall structure forming a lubricant chamber surrounding at least a portion of said tubular wall and an air duct around the rearward portion of said inner wall structure having an annular opening at the rear end of said casing and a lateral opening, said tubular wall having passages extending therein so as to communicate with the spaces at the ends of said tubular wall and with the lubricant chamber, said tubular wall having radial openings connecting said lubricant chamber with the shaft space inside said tubular wall; a shaft extending axially through said shaft space of said tubular wall; bearings at the ends of said tubular wall supporting said shaft for rotation; a turbine at the front end of said casing having a rotor on the front end of said shaft; a fan structure on the rear end of said casing having an impeller connected to the rear end of said shaft with blades for moving air through said annular opening; walls at the ends of said casing to form fan chambers across the ends of said tubular wall; fan members on said shaft in said fan chambers adjacent the ends of said tubular wall for producing flows of fluid inwardly from said lubricant chamber through said radial openings in said tubular wall, outwardly therefrom through said shaft space and through said bearings, and inwardly axially from the ends of said tubular wall through said passages to said lubricant chamber; and a passage extending longitudinally through said inner wall structure from end to end of said casing for balancing the fluid pressures around said shaft externally adjacent said fan chambers.

13. A turbine driven fan unit comprising: a generally tubular housing having an outer wall structure and an inner wall structure cooperatively defining an air passage communicating with an annular opening; a shaft rotatably supported from the inner wall structure; a tubular wall connected to and extending from one end of said housing defining an axial flow air passage communicating with said opening; a fan carried by the adjacent end of said shaft, having vanes in the airflow path of said opening; a unitary casing connected to and extending from the opposite end of said housing defining a fluid chamber and a tubular wall enclosing an axial flow passage communicating through a nozzle space with said chamber; and a turbine rotor mounted on the adjacent end of the shaft, having blades operatively associated with said nozzle space.

14. A turbine driven fan unit comprising: a generally tubular housing having an outer wall structure and an inner wall structure cooperatively defining an air passage communicating with an annular opening; a shaft rotatably supported from the inner wall structure; a tubular wall connected to and extending from one end of said housing defining an axial flow air passage communicating with said opening; a fan carried by the adjacent end of said shaft, having vanes in the airflow path of said opening; a unitary casing connected to and extending from the opposite end of said housing defining a fluid chamber and a tubular wall enclosing an axial flow passage communicating through a nozzle space with said chamber; means defining nozzle channels positioned and clamped between portions of said unitary casing and portions of the adjacent housing; and a turbine rotor mounted on the adjacent end of the shaft, having blades operatively associated with the nozzle channels.

15. In a device of the character described: a housing; fan means at one end of the housing; turbine means at the other end of the housing; a drive shaft interconnecting said turbine means and fan means; a tubular bearing support in said housing surrounding said shaft; axially spaced shaft bearings in said support; an oil reservoir; means for conducting oil from said reservoir to a portion of the shaft surface positioned between said bearings, rotation of the shaft acting to break up the oil deposited thereon into a mist; suction means actuated by said shaft for drawing the oil mist toward and through each bearing; and means defining circulatory flow passages for the oil between said suction means and the oil reservoir, and between the oil reservoir and the interior of the bearing support.

16. In a device of the character described: a housing; driven means at one end of the housing; turbine means at the other end of the housing; a drive shaft interconnecting said turbine means and driven means; a tubular bearing support in said housing surrounding said shaft; axially spaced shaft bearings in said support; an oil reservoir; means for conducting oil from said reservoir to a portion of the shaft surface positioned between said bearings, rotation of the shaft acting to break up the oil deposited thereon into a mist; means defining a chamber at each end of the tubular bearing support, positioned outwardly of said bearings; fan means in each of said chambers for drawing oil and oil mist into the chamber from the interior of the bearing support between the bearings; means for applying fluid pressure around the shaft externally adjacent said chambers to oppose oil flow from the chambers along the shaft; and means defining circulatory flow passages for the oil and oil mist between said chambers and the oil reservoir, and between the oil reservoir and the interior of the bearing support.

17. In a device of the character described: a housing; driven means at one end of the housing; turbine means at the other end of the housing; a drive shaft interconnecting said turbine means and driven means; a tubular bearing support in said housing surrounding said shaft; axially spaced shaft bearings in said support; an oil reservoir; means for conducting oil from said reservoir to a portion of the shaft surface positioned between said bearings, rotation of the shaft acting to break up the oil deposited thereon into a mist; means defining a chamber at each end of the tubular bearing support, positioned outwardly of said bearings; fan means in each of said chambers for drawing oil and oil mist into the chamber from between the bearings; means applying a fluid pressure around the shaft externally adjacent each of said chambers to oppose oil flow from the chambers along the shaft; a passage for equalizing the fluid pressures associated with the chambers; and means defining circulatory flow passages for the oil and oil mist between said chambers and the oil reservoir and between the oil reservoir and the interior of the bearing support.

HOMER J. WOOD.

REFERENCES CITED

The following references are of record in the file of this patent:

UNITED STATES PATENTS

| Number | Name | Date |
|---|---|---|
| 1,268,095 | Coe | June 4, 1918 |
| 1,355,652 | Coppus et al. | Oct. 12, 1920 |
| 1,427,150 | Coppus | Aug. 29, 1922 |
| 2,042,550 | Puffer | June 2, 1936 |
| 2,390,332 | Schmidt | Dec. 4, 1945 |
| 2,391,512 | Ponomareff | Dec. 25, 1945 |
| 2,410,450 | Kroon | Nov. 5, 1946 |

Certificate of Correction

Patent No. 2,492,672 December 27, 1949

HOMER J. WOOD

It is hereby certified that error appears in the printed specification of the above numbered patent requiring correction as follows:

Column 1, line 40, for "precluding" read *preloading*;

and that the said Letters Patent should be read with this correction therein that the same may conform to the record of the case in the Patent Office.

Signed and sealed this 25th day of April, A. D. 1950.

[SEAL]

THOMAS F. MURPHY,
*Assistant Commissioner of Patents.*